(12) United States Patent
McStay et al.

(10) Patent No.: US 9,939,547 B2
(45) Date of Patent: *Apr. 10, 2018

(54) WIRELESS SUBSEA MONITORING AND CONTROL SYSTEM

(71) Applicant: FMC Technologies, Inc., Houston, TX (US)

(72) Inventors: Daniel McStay, Aberdeenshire (GB); John J. Mulholland, Kongsberg (NO); David Kane, Edinburgh (GB)

(73) Assignee: FMC Technologies, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,330

(22) Filed: Aug. 8, 2016

(65) Prior Publication Data

US 2016/0341844 A1  Nov. 24, 2016

Related U.S. Application Data

(63) Continuation of application No. 13/138,801, filed as application No. PCT/US2010/000989 on Mar. 31, 2010, now Pat. No. 9,435,908.

(60) Provisional application No. 61/211,641, filed on Apr. 1, 2009.

(51) Int. Cl.
*G01V 3/15* (2006.01)

(52) U.S. Cl.
CPC .................................. *G01V 3/15* (2013.01)

(58) Field of Classification Search
USPC ........................................... 166/372, 250.01
See application file for complete search history.

*Primary Examiner* — Albert K Wong
(74) *Attorney, Agent, or Firm* — Henry C. Query, Jr.

(57) ABSTRACT

A method for monitoring a subsea hydrocarbon production or processing apparatus involves mounting a subsea control module (SCM) on or adjacent the apparatus, mounting a first base unit on or adjacent the apparatus at a distance from the SCM, mounting a plurality of first sensor devices on the apparatus, each of the plurality of first sensor devices being configured to generate a first sensor signal representative of a condition of a component of the apparatus or a property of a fluid in the apparatus, operating each first sensor device to generate a corresponding first sensor signal, wirelessly transmitting each first sensor signal from its corresponding first sensor device to the first base unit, wirelessly receiving the first sensor signals at the first base unit, transmitting the first sensor signals from the first base unit to the SCM, and receiving the first sensor signals at the SCM. In this manner, the SCM is provided with a plurality of first sensor signals which are representative of a condition of each of a number of first components of the apparatus and/or a property of a fluid at each of a number of first locations in the apparatus.

12 Claims, 1 Drawing Sheet

WIRELESS SUBSEA MONITORING AND CONTROL SYSTEM

This application is a continuation of U.S. patent application Ser. No. 13/138,801 filed on Dec. 21, 2011, which is a national stage filing of International Patent Application No. PCT/US2010/000989 filed on Mar. 31, 2010, which is based upon and claims priority from U.S. Provisional Patent Application No. 61/211,641 filed on Apr. 1, 2009.

The present invention relates to a system for monitoring and controlling subsea hydrocarbon production and processing systems. More particularly, the invention relates to a monitoring and control system which includes a multitude of wireless sensors for monitoring various operating conditions of a subsea production or processing system. The sensors generate signals relating to the operating conditions and transmit these signals to a local wireless base unit using, for example, radio frequency communication. The wireless base unit in turn communicates the sensor data to an adjacent subsea control module, which generates command signals for controlling various components of the subsea production or processing system based upon the sensor data or relays the sensor data to a surface-based monitoring and control station for further processing.

BACKGROUND OF THE INVENTION

Subsea production systems typically include a christmas tree or similar apparatus which is mounted at the upper end of a well bore that extends into a subterranean hydrocarbon-bearing formation. The principal function of the christmas tree is to provide an interface between the well and the external environment for regulating the flow of production fluid from the well and for facilitating intervention on the well or downhole systems during the operational life of the well. Accordingly, christmas trees commonly include a number of flow control valves and associated actuators for controlling the flow of production fluid from the well, as well as multiple sensors for monitoring certain operating conditions of the production system, such as the state of the valves and actuators and the properties of the production fluid.

Similarly, subsea processing systems usually comprise flow control valves and associated actuators for regulating the flow of production fluid through a processing apparatus. In addition, these systems commonly employ a number of sensors for monitoring certain operating conditions of the system, such as the state of the various components of the apparatus and the properties of the production fluid.

The various components of subsea production and processing systems are controlled and/or monitored by a subsea control module (SCM) which in turn is monitored and/or controlled by a remote monitoring and control station. The SCM is normally located on or adjacent the subsea production or processing apparatus, and the monitoring and control station is typically located on a surface vessel or platform or at a remote land-based facility. The SCM is usually connected to the monitoring and control station through an umbilical. The umbilical may include hydraulic lines for supplying hydraulic fluid to various hydraulic actuators located on he subsea production or processing apparatus. The umbilical may also include electric and/or fiber optic lines for supplying electrical power to certain components of the production and processing system and for communicating control signals and data between the monitoring and control station and the SCM.

Conventional subsea production and processing systems incorporate a relatively small number of sensors to measure the operating conditions of the system. In order to maximize production efficiency it is necessary to optimize the functioning of the subsea production or processing system. A key component in such optimization is the effective monitoring of the system using a range of sensors. To do this effectively requires employing far more sensors on the system than are conventionally used.

In addition to the sensors, means for relaying the sensor outputs to the SCM are also required. The sensors on subsea production and processing systems are conventionally hardwired to the SCM using electrical or optical fiber cabling. The requirement for such cabling and their connections into the sensors and the SCM constitute a significant cost and technical challenge. Further, when the number of sensors is greatly increased, the cabling and connections become a major limitation. Moreover, employing a large number of sensors and associated cabling under the insulation layer on, for example, a christmas tree is restricted by the potential for the cables to damage or degrade the insulation.

Conventionally acoustic techniques have been employed for underwater wireless communication. However, such systems have low data capacity and are limited by background noise and noise from subsea devices. In addition, acoustic communications are adversely affected by ambient conditions, such as temperature gradients and air bubbles. Acoustic systems are thus not a viable option for wirelessly connecting multiple sensors to an SCM in a subsea production or processing system.

Thus, there exists a need for an efficient and effective means for wirelessly connecting numerous sensors on a subsea production or processing apparatus to an SCM to enable the SCM and/or a remote monitoring and control station to monitor the operating conditions of the production or processing system and control various components of the system.

SUMMARY OF THE INVENTION

In accordance with the present invention, these limitations in the prior art are addressed by providing a subsea system for producing or processing a hydrocarbon production fluid with a plurality of sensors, each of which generates a sensor signal that is representative of a condition of a component of the system or a property of a fluid; a base unit which mounted on or adjacent the system and is in wireless communication with each of the sensors; and a subsea control module which is in communication with the base unit. In operation, the sensor signals are transmitted wirelessly from the sensors to the base unit and are then transmitted from the base unit to the subsea control module.

The sensor signals may be transmitted from the sensors to the base unit using, for example, radio frequency signals, magnetic signals, or optical signals. In addition, the sensor signals may be digitally modulated.

In accordance with one embodiment of the invention, the base unit is mounted apart from the subsea control module.

In accordance with another embodiment of the invention, the base unit comprises a memory in which a plurality of the sensor signals are stored prior to being transmitted to the subsea control module.

In accordance with a further embodiment of the invention, each sensor comprises or is connected to a corresponding wireless receiver. In addition, each sensor may comprise a memory in which its corresponding sensor signal is stored prior to being transmitted to the base unit. Furthermore, each sensor may transmit its corresponding sensor signal to the base unit in response to a command signal received from the base unit. Moreover, the base unit may comprise a memory in which a plurality of the sensor signals are stored prior to being transmitted to the subsea control module.

In accordance with yet another embodiment of the invention, each sensor comprises a corresponding local power supply. In addition, the power supply may be replenishable. For example, each of a plurality of the sensors may comprise a Seebeck device for replenishing the power supply.

In accordance with still another embodiment of the invention, the subsea system comprises a second base unit which is mounted on or adjacent the system and is in communication with the subsea control module. In this embodiment, each of the base units is in wireless communication with corresponding ones of the plurality of sensors.

Thus, the present invention uses wireless systems to access a multitude of sensors deployed on subsea production or processing systems. According to the invention, a wireless base station is located on the subsea system and multiple wireless sensors are placed at relevant locations on, e.g., a christmas tree or subsea processing apparatus. Preferably, the wireless communication is achieved using radio frequency. Although radio frequencies are heavily attenuated in water, the short ranges required for the on-system communications involved in the present invention are achievable using such frequencies. The wireless communications may also be effected using magnetic or optical signals.

The resultant reduction in cost and cabling requirements allows far more sensors to be deployed on the subsea apparatus. The use of a multitude of sensors enhances the quality and utility of the data obtained and provides the basis for enhanced operation of the subsea system.

These and other objects and advantages of the present invention will be made apparent from the following detailed description, with reference to the accompanying drawings. In the drawings, the same reference numbers may be used to denote similar components in the various embodiments.

DETAILED DESCRIPTION OF THE INVENTION

Figures 1, 1A:
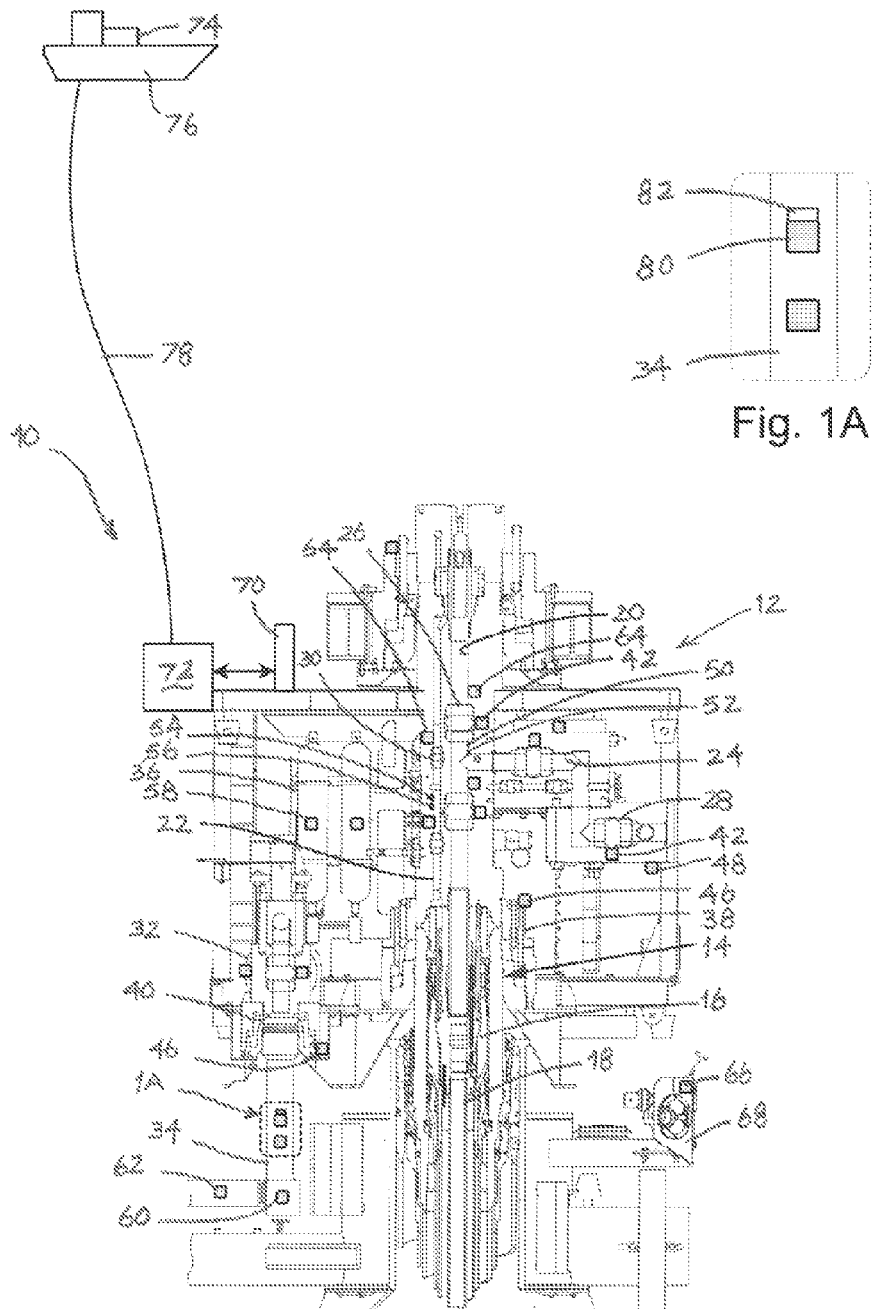
FIG. 1 is a schematic representation of the wireless subsea monitoring and control system of the present invention shown in conjunction with an exemplary subsea christmas tree.
FIG. 1A is an enlarged view of the portion of the christmas tree designated "1A" in FIG. 1.

The wireless subsea monitoring and control system of the present invention utilizes wireless sensors and sensor networks to overcome the practical and cost imposed limitations of conventional hardwired monitoring and control systems when incorporating many more sensors than is conventionally utilized. The ability to incorporate many more sensors greatly enhances the effectiveness of real-time hydrocarbon production management. In addition, the increased data obtained from the sensors may be used with conventional condition performance monitoring techniques to provide enhanced assessment of system performance and status, which can subsequently be utilized for planned maintenance and failure prediction.

Although the wireless subsea monitoring and control system of the present invention is applicable to a variety of subsea production and processing systems, for purposes of brevity it will be described hereafter in the context of an exemplary subsea christmas tree.

Referring to FIG. 1, the wireless subsea control and monitoring system of the present invention, which is indicated generally by reference number 10, is shown installed on an exemplary christmas tree 12. The christmas tree 12 is mounted on a wellhead 14 which is positioned at the upper end of a well bore (not shown). The wellhead 14 supports a tubing hanger 16 which is connected to the upper end of a tubing string 18 that extends through the well bore to a subterranean hydrocarbon formation.

The christmas tree 12 includes an axial production bore 20 which communicates with the tubing string 18 and a vertical annulus bore 22 which communicates with the tubing annulus. The production bore 20 is connected to a production outlet 24 through which the production fluid is conveyed during normal operation of the christmas tree 12.

The christmas tree also includes a number of production bore valves 26 for controlling flow through the production bore 20, a number of production outlet valves 28 for controlling flow through the production outlet 24, and a number of annulus valves 30 for controlling flow through the annulus bore 22. During operation of the christmas tree 12, production fluid is diverted by the upper production bore valve 26 into the production outlet 24, through a choke 32 and out a production flowline 34 which may lead, for example, to a subsea processing system.

The valves 26, 28, 30 and the choke 32 are each actuated by a corresponding hydraulic or electric actuator. The hydraulic actuators are supplied by one or more accumulators 36, which in turn are connected to an external source of hydraulic fluid. The accumulators 36 may also supply a number of hydraulically actuated connectors, such as a tree connector 38 which secures the christmas tree 12 to the wellhead 14 and a flowline connector 40 which connects the production outlet to the production flowline 34.

In accordance with the present invention, numerous sensors are provided for monitoring the operating conditions of various components of the christmas tree 12 and the properties of the production fluid. For example, a number of position sensors 42 may be provided for monitoring the open or closed state of the valves 26, 28, 30, a position sensor 44 may be provided for monitoring the position of the choke 32, and a number of position sensors 46 may be provided for monitoring the latched or unlatched state of the connectors 38, 40. In addition, suitable sensors 48 may be provided for measuring the voltage or current of the electrical actuators associated with certain valves.

The properties of the production fluid may be monitored with a number of pressure and temperature sensors 50, 52 located at various points in the production bore 20 and the production outlet 24. Similarly, a number of pressure and temperature sensors 54, 56 may be provided to measure the pressure and temperature of the fluid in the tubing annulus and the tubing bore. In addition, pressure sensors 58 may be provided for measuring the pressure of the hydraulic fluid in the accumulators 36, and a number of erosion detectors 60 and a vibration detectors 62 may be provided to measure the wear and vibration of certain components of the christmas tree 12, such as the production flowline 34.

The christmas tree 12 may also include a number of leak detectors 64 for detecting leakage past various seals and valves, and one or more ROV position sensors 66 for sensing the presence of an ROV at a corresponding docking station 68.

In accordance with the present invention, the wireless subsea control and monitoring system 10 includes as wireless transmitter/receiver base unit 70 which is ideally mounted on or adjacent the christmas tree 12. The base unit 70 communicates wirelessly with the sensors, preferably using radio frequency signals. Accordingly, the base unit 70 is located within a suitably short range of the sensors to ensure that the radio frequency signals are not overly attenuated in the surrounding water.

The base unit 70 transmits the received sensor data to a conventional SCM 72. The SCM 72 is configured in a conventional manner to enable it to monitor the operating conditions of the christmas tree 12, including the properties of the production fluid, and control certain components of the christmas tree based on the sensor data. The SCM 72 may also communicate the sensor data to a remote monitoring and control station 74. In the exemplary embodiment of the invention shown in FIG. 1, the monitoring and control station 74 is located on a surface vessel 76 and is connected to the SCM 72 through an umbilical 78. Like the SCM 72, the monitoring and control station 74 monitors the operating conditions of the christmas tree 12 and generates signals for controlling certain components of the christmas tree. These controls signals are communicated to the SCM 72, which then controls the components as instructed.

Also, the sensors may comprise wireless receivers, and the base unit 70 may be configured to wirelessly transmit control signals to the sensors. For example, the sensors may be provided with memory to store their associated data and then transmit the data upon receipt of an appropriate signal from the base unit 70. Furthermore, the base unit 70 may relay the sensor data in real time to the SCM 72 or may be provided with means to store the sensor data for subsequent relay to the control module.

The sensors may be conventional devices which are selected depending on the parameters which are desired to be detected. In addition, the sensors ideally include communications electronics for converting the sensor data into signals which can be transmitted wirelessly and for transmitting the sensor data to the base unit 70. Alternatively, one or more of the sensors may be conventional devices which in turn are connected to a wireless transceiver. An example of such a wireless enabled sensor is shown in FIG. 1A. In this example, a conventional pressure sensor 80 is hardwired to a wireless transmitter 82. The transceiver 82 receives the data from the sensor 80, converts it into a format capable of being transmitted wirelessly, and then transmits the data signal to the base unit 70.

The sensors and the base unit 70 may be configured to communicate using any suitable communication scheme, such as that disclosed in WO 2008/109929 A1, which is hereby incorporated herein by reference. In addition, the sensors may be powered with batteries or capacitors that are replenished using conventional power scavenging techniques, such as vibration, thermal, light or wireless signals. One suitable energy scavenging technique which employs a Seebeck device is disclosed in WO 2008/109929 A1.

A range of wireless sensors may be employed to measure the relevant operating conditions of the christmas tree and the production fluid, such as pressure, temperature, flow, vibration, corrosion, leakage, erosion, sand, strain and production fluid content and composition. In addition, sensors may be provided to measure motor current and voltage of the electric actuators, and vibration and displacement or rotation of their associated valves.

By way of example, a vibration sensor may be provided for detecting vibration in a flowline. Pressure and temperature sensors may be provided for monitoring the production fluid. One or more leak detection sensors may be provided for monitoring integrity of certain connections. Erosion and/or corrosion sensors may be provided in the flow loops. Valve position sensors, choke position sensors, and ROV panel position indicators may be provided for monitoring the actual valve positions. Shear pin failure sensors may be provided for monitoring the hydraulic actuators and linear overrides. Other various component sensors may also be provided for monitoring parameters such as motor voltage, motor current, pump characteristics, etc.

Also, multiple sensors may be provided for measuring a particular parameter at a given location or component. For example, multiple voltage and current sensors may be provided to allow measurement of particular electric motor performance as well as voltage or current surges, spikes, etc. The duplicate sensors provide both built in redundancy and a means for cross-checking sensor performance.

In another embodiment multiple wireless base units may be deployed on or near the christmas tree or subsea processing system to access the multitude of sensors. In this embodiment each base unit may be configured to communicate with a corresponding set of sensors.

As an alternative to radio frequency communications, the subsea wireless monitoring and control system of the present invention may employ magnetic or optical signals. In any case, however, the transmitters will preferably generate and detect digitally modulated signals.

In another embodiment of the invention, the wireless monitoring and control system may include conventional means to compress the sensor data prior to transmission so that a lower carrier frequency, which will have a lower attenuation in water, may be employed. This will allow either greater ranges to be used or the power requirements for the wireless systems to be reduced.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A method for monitoring a subsea hydrocarbon production or processing apparatus, the method comprising:
   mounting a subsea control module (SCM) on or adjacent the apparatus;
   mounting a first base unit on or adjacent the apparatus at a distance from the SCM;
   mounting a plurality of first sensor devices on the apparatus, each of the plurality of first sensor devices being configured to generate a first sensor signal representative of a condition of a component of the apparatus or a property of a fluid in the apparatus;
   operating each first sensor device to generate a corresponding first sensor signal;
   wirelessly transmitting each first sensor signal from its corresponding first sensor device to the first base unit;
   wirelessly receiving the first sensor signals at the first base unit;
   transmitting the first sensor signals from the first base unit to the SCM; and
   receiving the first sensor signals at the SCM;
   whereby the SCM is provided with a plurality of first sensor signals which are representative of a condition of each of a number of first components of the apparatus and/or a property of a fluid at each of a number of first locations in the apparatus.

2. The method of claim 1, further comprising:
operating at least one of the SCM and the first base unit to generate a first command signal;
wirelessly transmitting the first command signal from the first base unit to the first sensor devices; and
wirelessly receiving the first command signal at each first sensor device;
wherein each first sensor device wirelessly transmits its corresponding first sensor signal to the first base unit in response to the first sensor device receiving the first command signal.

3. The method of claim 2, wherein the first command signal is transmitted from the first base unit to each first sensor device simultaneously.

4. The method of claim 2, further comprising:
after the step of operating each first sensor device to generate a corresponding first sensor signal, and prior to the step of receiving the first command signal at each first sensor device, storing each first sensor signal at its corresponding first sensor device.

5. The method of claim 4, further comprising:
after the step of wirelessly receiving the first sensor signals at the first base unit, and prior to the step of transmitting the first sensor signals from the first base unit to the SCM, storing the first sensor signals at the first base unit.

6. The method of claim 1, further comprising:
after the step of wirelessly receiving the first sensor signals at the first base unit, and prior to the step of transmitting the first sensor signals from the first base unit to the SCM, storing the first sensor signals at the first base unit.

7. The method of claim 1, further comprising:
mounting a second base unit on or adjacent the apparatus at a distance from both the SCM and the first base unit;
mounting a plurality of second sensor devices on the apparatus, each of the plurality of second sensor devices being configured to generate a second sensor signal representative of a condition of a component of the apparatus or a property of a fluid in the apparatus;
operating each second sensor device to generate a corresponding second sensor signal;
wirelessly transmitting each second sensor signal from its corresponding second sensor device to the second base unit;
wirelessly receiving the second sensor signals at the second base unit;
transmitting the second sensor signals from the second base unit to the SCM; and
receiving the second sensor signals at the SCM;
whereby the SCM is provided with a plurality of second sensor signals which are representative of a condition of each of a number of second components of the apparatus and/or a property of a fluid at each of a number of second locations in the apparatus.

8. The method of claim 7, further comprising:
operating at least one of the SCM and the first base unit to generate a first command signal;
operating at least one of the SCM and the second base unit to generate a second command signal;
wirelessly transmitting the first command signal from the first base unit to the first sensor devices;
wirelessly transmitting the second command signal from the second base unit to the second sensor devices;
wirelessly receiving the first command signal at each first sensor device; and
wirelessly receiving the second command signal at each second sensor device;
wherein each first sensor device wirelessly transmits its corresponding first sensor signal to the first base unit in response to the first sensor device receiving the first command signal; and
wherein each second sensor device wirelessly transmits its corresponding second sensor signal to the second base unit in response to the second sensor device receiving the second command signal.

9. The method of claim 8, wherein the first command signal is transmitted from the first base unit to the first sensor devices simultaneously and the second command signal is transmitted from the second base unit to the second sensor devices simultaneously.

10. The method of claim 8, further comprising:
after the step of operating each first sensor device to generate a corresponding first sensor signal, and prior to the step of receiving the first command signal at each first sensor device, storing each first sensor signal at its corresponding first sensor device; and
after the step of operating each second sensor device to generate a corresponding second sensor signal, and prior to the step of receiving the second command signal at each second sensor device, storing each second sensor signal at its corresponding second sensor device.

11. The method of claim 10, further comprising:
after the step of wirelessly receiving the first sensor signals at the first base unit, and prior to the step of transmitting the first sensor signals from the first base unit to the SCM, storing the first sensor signals at the first base unit; and
after the step of wirelessly receiving the second sensor signals at the second base unit, and prior to the step of transmitting the second sensor signals from the second base unit to the SCM, storing the second sensor signals at the second base unit.

12. The method of claim 7, further comprising:
after the step of wirelessly receiving the first sensor signals at the first base unit, and prior to the step of transmitting the first sensor signals from the first base unit to the SCM, storing the first sensor signals at the first base unit; and
after the step of wirelessly receiving the second sensor signals at the second base unit, and prior to the step of transmitting the second sensor signals from the second base unit to the SCM, storing the second sensor signals at the second base unit.

* * * * *